United States Patent [19]
> Eastman

[11] 4,373,858
[45] Feb. 15, 1983

[54] FLOW REGULATING SHAFT SEAL FOR AN AIR MOTOR

[75] Inventor: James M. Eastman, South Bend, Ind.

[73] Assignee: The Bendix Corporation, Southfield, Mich.

[21] Appl. No.: 214,902

[22] Filed: Dec. 10, 1980

[51] Int. Cl.³ .............................................. F01D 11/04
[52] U.S. Cl. .................................... 415/112; 415/113; 415/176
[58] Field of Search ............... 415/173 R, 176, 110, 415/111, 112, 113; 277/3, 27, 88

[56] References Cited
U.S. PATENT DOCUMENTS

| | | | |
|---|---|---|---|
| 2,326,824 | 8/1943 | Browne et al. | 277/88 X |
| 3,269,317 | 8/1966 | Lattanzio et al. | 415/122 X |
| 3,347,552 | 10/1967 | Frisch | 277/27 |
| 3,443,815 | 5/1969 | Voitik et al. | 277/88 X |

Primary Examiner—Harvey C. Hornsby
Assistant Examiner—Christine A. Peterson
Attorney, Agent, or Firm—Leo H. McCormick, Jr.; Ken C. Decker

[57] ABSTRACT

A valve arrangement responsive to a pressure differential continuously throttles air flowing through a labyrinth seal, allowing only a small fraction of the leakage that would otherwise occur. The arrangement accomodates radial and axial shaft displacement without rubbing contact. This avoids seal wear for high shaft rotating speeds, high temperatures and/or rapid temperature changes.

7 Claims, 3 Drawing Figures

FLOW REGULATING SHAFT SEAL FOR AN AIR MOTOR

BACKGROUND OF THE INVENTION

This invention relates to a valve for limiting the flow of hot fluid from an operational chamber of a rotor along a flow path defined by the clearance of a shaft and the housing of the rotor.

In jet engine powered aircraft it is common practice to use hot compressor discharge air as the motive force for air motors used to operate various controls. The temperature of such compressor discharge air on entering an air motor often exceeds 1100° F. In order to permit the components of the air motor to expand in response on exposure to such hot compressor discharge air, large clearances are provided between the shaft of the rotor and the housing of the air motor.

Unfortunately, such large clearance allows a portion of the hot compressor discharge air to flow to the surrounding environment reducing the efficiency of the rotor in addition to raising the temperature of the bearings of the rotor. High rotational speeds and operational temperatures preclude rubbing contact seals to eliminate such loss of hot fluid through the clearance since such seals adversely increase the drag on the rotor to further reduce efficiency of the air motor.

Labyrinth seals have been used to reduce the leakage of the hot fluid through such clearance. However, labyrinth seals are relatively ineffective at high pressures and when used in air motors permit sufficient hot compressor discharge air to flow through the clearance to adversely affect the bearings.

U.S. patent application Ser. No. 958,590, filed Nov. 7, 1978, and now U.S. Pat. No. 4,276,006, discloses a system for cooling the bearings in the rotor of an air motor. Unfortunately, when the rotor is being operated at a high speed with high pressure compressor discharge air, the air flow being drawn through the bearings could be reduced by an increase in volume of the compressor discharge air flow through the clearance. This can reduce the effectiveness of such a cooling system.

SUMMARY OF THE INVENTION

In the present invention, an annular valve lip on a flange of a piston member of a valve moves with respect to a radial face on the rotor shafts adjacent each opening in the housing in response to a pressure differential to limit the flow of the operational fluid to the bearing clearances.

The piston member is slidably sealed with piston rings at a diameter somewhat larger than the lip diameter. It is also attached to a substantially larger bellows to define a chamber between a labyrinth seal and the radial face on the rotor shaft. The pressure of the operational fluid acts between the lip and the seal diameters to develop an operational force which urges the piston toward the labyrinth seal and establishes a variable area orifice between the lip and the face to allow the operational fluid to flow into the chamber. The pressure of the operational fluid in the chamber acts between the seal and the bellows effective diameters to oppose the operational force and move the lip of the flange toward the radial face. The pressure of the fluid in the chamber is lower than the pressure of the operational fluid supplied to the rotor because of the restrictive flow that occurs between the valve lip and the face. For each pressure change in the operational fluid, the piston, and the valve are moved to a new equalization position such that the force developed by the chamber pressure balances the operational force. Since the operational fluid pressure acts on a relatively smaller area than does the chamber pressure, balance occurs with the chamber pressure substantially smaller than the operational pressure. The leakage flow through the labyrinth seal is correspondingly reduced. As the pressure in the operational fluid increases, the variable orifice is continuously adjusted to reduce leakage of the operational fluid from the rotor housing. Since more of the operational fluid is retained in the housing, a bearing cooling system can more easily keep the operating temperature of the bearing at an acceptable level.

An advantageous effect of this invention occurs through the conservation of the operating fluid to provide a rotor in an air motor with an input.

Another advantage of this invention occurs through the retention of a hot operating fluid of a rotor in a housing since a cooling system for the bearings does not have to remove that portion of the hot fluid from the bearing area.

It is therefore an object of this invention to provide an air motor with a valve arrangement to limit the flow of hot fluid through the clearance provided between a housing and a shaft.

It is a further object of this invention to provide an air motor with a valve that limits the flow of hot fluid into a cooling system for a bearing arrangement.

These and other advantages and objects should be apparent from reading this specification and viewing the drawings.

DETAILED DESCRIPTION OF THE INVENTION

Figure 1:
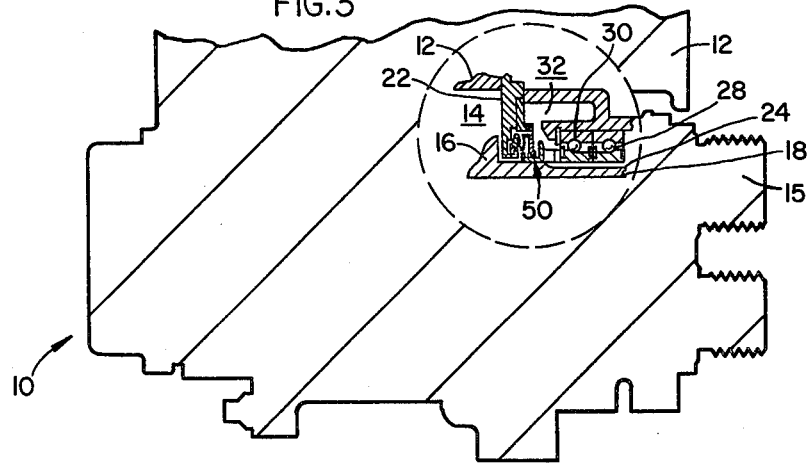
FIG. 1 is a schematic illustration of an air motor valve with a sectional view made according to the principles of this invention for limiting the flow of hot fluid from a rotor chamber.

The air motor 10 shown in FIG. 1 has a housing 12 with a chamber 14 located therein for retaining a rotor 16. The rotor 16 is attached to a shaft 18 that extends through an opening 20 in a wall 22 of the housing. As disclosed in U.S. Pat. No. 4,276,006, the shaft 18 has grooves 24, only one of which is shown located on the end thereof to allow air from the surrounding environment to cool the inner race 26 of bearings 28 and 30.

Conduit 32 is connected to slots 24 by passage 34 and to rotor chamber 14 by the clearance between opening 20 and the peripheral surface of the shaft 18.

A labyrinth seal 36 attached to wall 22 has a series of annular lands 38, 40, 42, and 44 that surround the shaft 18 to restrict the flow of fuel from chamber 14 through the clearance. However, due to the rapid exposure to differing temperature conditions, sufficient clearance between the lands and shaft must be maintained in order to prevent contact between these components which would result in frictional drag.

An annular shield 46 acts as a baffle to direct hot fluid that flows through the clearance of the labyrinth seal 36 away from bearing 28 and 30 and into passage 34.

Figure 2:
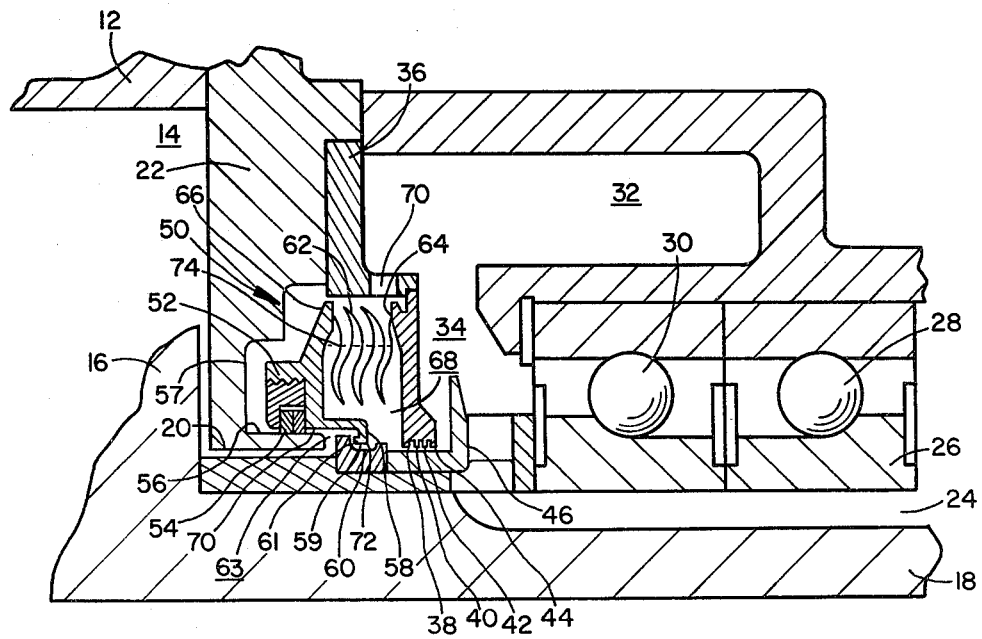
FIG. 2 is an enlarged view within the circumscribed line 2 of FIG. 1.

The valve 50 which surrounds each shaft end of the rotors in the air motor 10 is shown in detail in FIG. 2.

Valve 50 includes an annular piston 52 which carries a seal 54 that engages surface 56 in wall 22. A flange 58 extends from the piston 52 into a groove 60 on shaft 18. The flange 58 has a valve lip 59 that is parallel to radial face 61 adjacent groove 60. A bellows 62 has a first end 64 attached to the labyrinth seal 36 and a second end 66 attached to piston 52. The piston 52, bellows 62, labyrinth seal 36 and shaft 18 define a chamber 68. The labyrinth seal 36 has an opening 70 therein to communicate fluid in conduit 32 into a second chamber formed between piston 52 and wall 22.

MODE OF OPERATION OF THE INVENTION

When the air motor 10 is in operation, hot fluid is presented to chamber 14 causing the rotors 16 to rotate with respect to housing 12 and provide an operational output through shaft connection 15 to another device.

A portion of the hot fluid in chamber 14 flows through the clearance between shaft 18 and housing 22 to a chamber 63. The pressure of the hot fluid acts on flange 58 to overcome the spring force in bellows 62 and move piston 52 toward the labyrinth seal 36.

As the piston moves toward the labyrinth seal 36 the opening or orifice between radial face 61 and valve lip 59 initially increases to allow the hot fluid to flow into chamber 68. The pressure of the hot fluid in chamber 68 acts on the flange 58 and piston 52 to develop an operational force which is additive to the spring force in the bellows 62 to oppose the movement of the piston 52 toward the labyrinth seal 36 and to move the valve lip 59 toward the radial face 61 to throttle the flow in chamber 68. At some point, the force acting toward the labyrinth seal 36 on the flange 58 and the force acting on the flange 58 and piston 52 away from labyrinth seal 36 are balanced to limit the flow of hot fluid into chamber 68 and lower the pressure of the hot fluid before it is presented to the labyrinth seal 36 for removal to the surrounding environment through passage 34 and conduit 32.

The equilibrium position where the forces are in balance can be calculated since each force is equal to a pressure difference multiplied by an area involved in the piston and can be written in the following manner:

The force moving the piston 52 and flange 58 toward the labyrinth seal 36 can be calculated as follows:

$$F_1 = (P_f - P_x)(A_1) \quad (1)$$

where:

$P_f$ = pressure of the hot fluid in chamber 15
$P_x$ = pressure of the hot fluid in chamber 68
$A_1$ = TT times radius of surface 56 squared minus TT times mean radius of valve lip 59 squared The opposing force moving the piston 52 and lip 59 toward the radial face 61 can be calculated as follows:

$$F_2 = (P_x - P_o)A_2 \quad (2)$$

where:

$P_o$ = pressure of the fluid in conduit 32

$A_2$ = TT times the effective radius 74 of the bellows 62 squared minus TT times radius of surface 56 squared In a balanced condition $F_1 = F_2$. When the values for equations 1 and 2 are substituted into this equation the following equation results:

$$F_1 = F_2 \text{ or } (P_f - P_x)(A_1) = (P_x - P_o)(A_2) \quad (3)$$
$$P_f A_1 - P_x A_1 = P_x A_2 - P_o A_2$$
$$P_f A_1 + P_o A_2 = P_x A_1 + P_x A_2$$

$$P_f A_1 \left(1 + \frac{P_o A_2}{P_f A_1}\right) = P_x A_1 \left(1 + \frac{A_2}{A_1}\right)$$

$$\frac{P_x A_1}{P_f A_1} = \frac{1 + \frac{P_o A_2}{P_f A_1}}{1 + \frac{A_2}{A_1}}$$

$$\frac{P_x}{P_f} = \frac{1 + \frac{P_o A_2}{P_f A_1}}{1 + \frac{A_2}{A_1}}$$

$$\frac{P_x}{P_f} = \frac{1 + \frac{A_2/A_1}{P_f/P_o}}{1 + A_2/A_1} \quad (3a)$$

Figure 3:
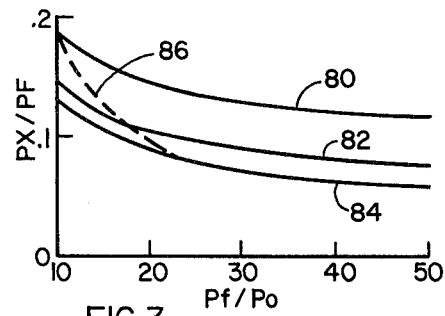
FIG. 3 is a graph showing the relative flow loss through a clearance between a housing and a shaft using the valve disclosed in this invention.

Since the areas $A_1$ and $A_2$ for the valve 52 are constant, the flow of hot fluid through valve 52 can be calculated for various ratios as illustrated in FIG. 3.

Assuming $A_2$ is 9 times larger than $A_1$, and the pressure in chamber 14 varies up to 50 times the pressure in bore 56 when these values are substituted in equation (3a), a curve 80 shown in FIG. 3 is produced. Similarly when the ratio of $A_2/A_1$ is 16 and 24, curves 82 and 84 are produced.

As long as $P_x$ is equal to or greater than $2 \times P_o$, sonic flow occurs and the flow of hot fluid through the clearance is choked and directly proportional to $P_x$. Thus, the ratio $P_x/P_f$ shows the leakage flow reduction accomplished by flow throttling at valve lip 59. In FIG. 3, unchoked flow occurs in the region to the left of curve 86. Here leakage flow is somewhat less than indicated by the $P_x/P_f$ curves.

As an example, assume that the fluid pressure in chamber 14 is 30 times the fluid pressure in conduit 32. Typically, the pressure in conduit 32 is approximately 15 psi, thus the pressure in chamber 14 is approximately 450 psi. Under these conditions if $P_f/P_o = 30$ and the $A_2/A_1 = 9$, the leakage through the clearance and labyrinth seal 36 is about 13% of the leakage when only a labyrinth seal 36 is used.

The valve 50 is designed such that at 68° F. and 14.7 psi, a nominal clearance is present between valve lip 59 and face 61. If a rise in the temperature of the fluid in chamber 14 is rapid, axial expansion of shaft 14 may occur such that face 61 moves toward valve lip 59 on flange 58. During such rapid expansion, the throttling through the resulting orifice lowers the pressure $P_x$ in chamber 68 so that the pressure differential $P_f - P_x$ acting on the flange area $A_1$ moves the piston 52 toward the labyrinth seal 36 to maintain the nominal clearance and prevent rubbing contact of the face 61 and valve lip 59. However, if any rubbing contact occurs due to the lack of squareness of valve 52 in bore 56, wear should correct this condition.

If the sliding contact of piston 52 on surface 56 is erratic due to differences in the coefficient of friction between seal 54 and the material in surface 56, or leakage occurs through seal 54, it may be necesary to replace seal 54 with a bellows concentric to bellows 62. Under these conditions one end of the concentric bellows would be connected to wall 22 and the other end to piston 52. It is assumed that the areas $A_1$ and $A_2$ and the throttling operation of the fluid through the orifice formed by the valve lip 59 on the flange 58 and face 61 would be the same. Thus, the energy savings resulting from the operation of such a valve would be substantially identical to the valve 50 described above and shown in the drawings.

I claim:

1. In a pneumatic motor having rotor means with shaft ends that extend through openings in a housing, said rotor means being moved by a supply of hot fluid under pressure to develop an output torque, said shaft ends having a predetermined clearance with said openings to allow for dimensional changes resulting from thermal differential expansion caused by the operational hot fluid, said predetermined clearance establishing flow paths through which hot fluid escapes into the surrounding envirionment, the improvement comprising:

valve means in each opening having a movable wall which surrounds said shaft end, each movable wall having a flange that extends into an adjacent flow path, a land on each shaft end, and resilient means connected to said housing for urging said movable wall toward said land, said hot fluid acting on said flange to produce an operational force which overcomes said resilient means and limits the flow of hot fluid to the surrounding environment through a variable orifice defined by the relationship between said flange and land to retain the hot fluid in the housing.

2. In a pneumatic motor having a housing for retaining a rotor, said rotor having a shaft that extends through openings in walls of the housing, bearing means adjacent said walls for retaining said shaft, seal means located between the bearing means and said walls which surround each opening and said shaft, said rotor responding to hot fluid under pressure to develop an output torque, said openings and seal means having a predetermined clearance with said shaft to permit thermal dimensional changes to occur therebetween resulting from the hot fluid, said predetermined clearance allowing a portion of the hot fluid to escape from the housing, characterized by said seal means including an end disc and a valve, said end disc being fixed to the housing, said valve having a piston located in a blind bore surrounding each of said openings, said piston having a flange that extends toward said shaft and a bellows fixed on each end disc and piston means, each bellows, end disc, piston means, and shaft defining a chamber, said hot fluid acting on said flange to move said piston and allow hot fluid to flow into said chamber, said flange restricting the flow of the hot fluid into the chamber to proportionally lower the pressure and establish an operational pressure in the chamber, said operational pressure acting on said flange and piston means to oppose the movement of said piston means and establish a balanced position for the piston means corresponding to the fluid pressure in the hot fluid, and a sleeve located in a groove on said shaft adjacent said chamber, said sleeve having a land with a face thereon, said flange and said face cooperating to define a variable area orifice with movement of said piston for limiting the flow of hot fluid through said clearance to conserve energy and reduce adverse thermal effects on said bearing means.

3. In the pneumatic motor, as recited in claim 1 further including:

a seal concentric to said shaft end and connected to said housing for establishing a chamber with the movable wall, said seal having said predetermined clearance to allow hot fluid to flow from said chamber to the surrounding environment.

4. In the pneumatic motor, as recited in claim 3 wherein the pressure of the hot fluid flowing through said orifice is reduced to produce an operational pressure in the hot fluid, said operational pressure acting on said movable wall and flange to produce a reactionary force that opposes the operational force, said reactionary force moving the movable wall and flange toward said land until a force balance occurs with the longitudinal force to establish a minimum flow of hot fluid through said flow path.

5. In the pneumatic motor, as recited in claim 4, wherein said resilient means includes:

a bellows fixed to said seal and movable wall, said bellows reacting to said operational pressure of the hot fluid in the chamber by expanding and contracting as the operational force positions the movable wall to establish said force balance.

6. In the pneumatic motor, as recited in claim 2, further including:

a shroud surrounding said shaft adjacent each end disc for directing the hot fluid away from said bearing means to reduce the thermal effect thereon.

7. In the pneumatic motor, as recited in claim 6, further including:

aspirator means connected to said shroud for evacuating the hot fluid flowing from the clearance between the end disc and shaft.

* * * * *